Feb. 24, 1959 J. ZUERCHER 2,874,823
BOWLING PIN HANDLING MECHANISM
Original Filed April 5, 1952 2 Sheets-Sheet 2

INVENTOR
JOHN ZUERCHER
BY
*Wentworth R. Clapham*
ATTORNEY

United States Patent Office 2,874,823
Patented Feb. 24, 1959

2,874,823
BOWLING PIN HANDLING MECHANISM

John Zuercher, Mansfield, Ohio, assignor to American Machine & Foundry Company, a corporation of New Jersey Original application April 5, 1952, Serial No. 280,697, now Patent No. 2,769,637, dated October 30, 1956. Divided and this application April 4, 1956, Serial No. 576,112

3 Claims. (Cl. 198—119)

The invention relates to bowling pin spotting machines, and more particularly to improvements in mechanism for delivering bowling pins rapidly and in succession to the pin spotting device of a bowling pin spotting machine.

This invention constitutes a division of my copending application, Serial Number 280,697, filed April 5, 1952, now Patent No. 2,769,637, for Distributor Mechanism for Bowling Pin Spotting Machines.

The invention consists in improved means and mechanism for receiving and orienting bowling pins such that they may be delivered properly to a pin distributor which directs and conveys them to the pin holding units of a pin spotter for placement in playing arrangement on a bowling alley.

The invention also consists in improved bowling pin orienting mechanism and coacting pin distributing means wherein pins delivered to the orienting mechanism are oriented for butt end forwarding movement onto the conveyor of the distributor means and wherein the construction and arrangement of the operating parts substantially completely eliminate any danger of jams in the delivery of pins from the orienting mechanism to the pin distributor means.

The invention also consists in improved pin receiving and orienting mechanism at the rear end of the distributor so constructed and arranged that the head ends of pins delivered thereinto by the conveyor which removes them from the pit of a bowling alley cannot get between the pin receiving element and the distributor chute along which pins are being conveyed by an endless conveyor and cause jams and breakage of parts.

With these and other objects not specifically mentioned in view, the invention consists in certain combinations, and constructions which will be fully described hereinafter, and then set forth in the claims hereunto appended.

Figure 1:
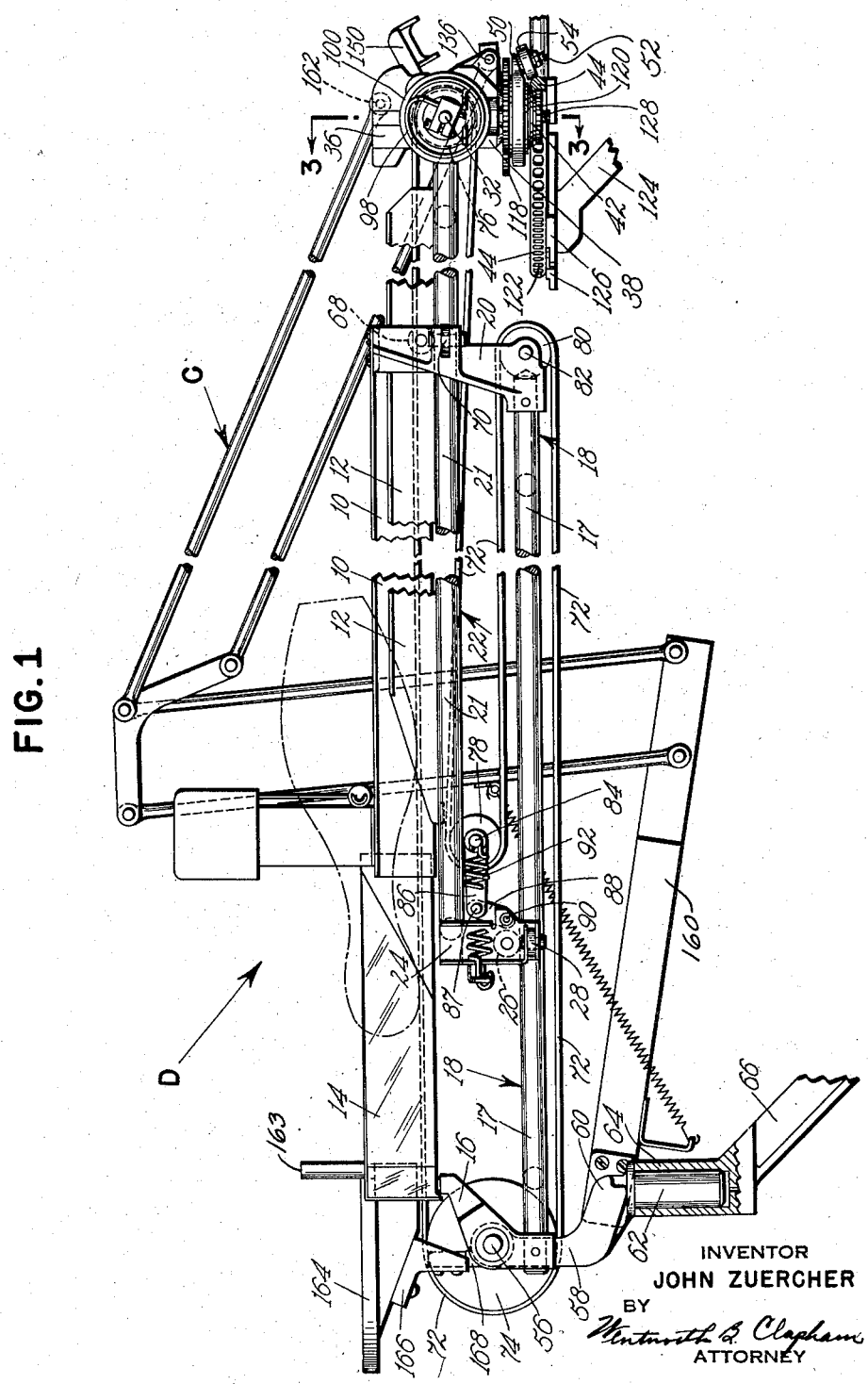
Figure 2:
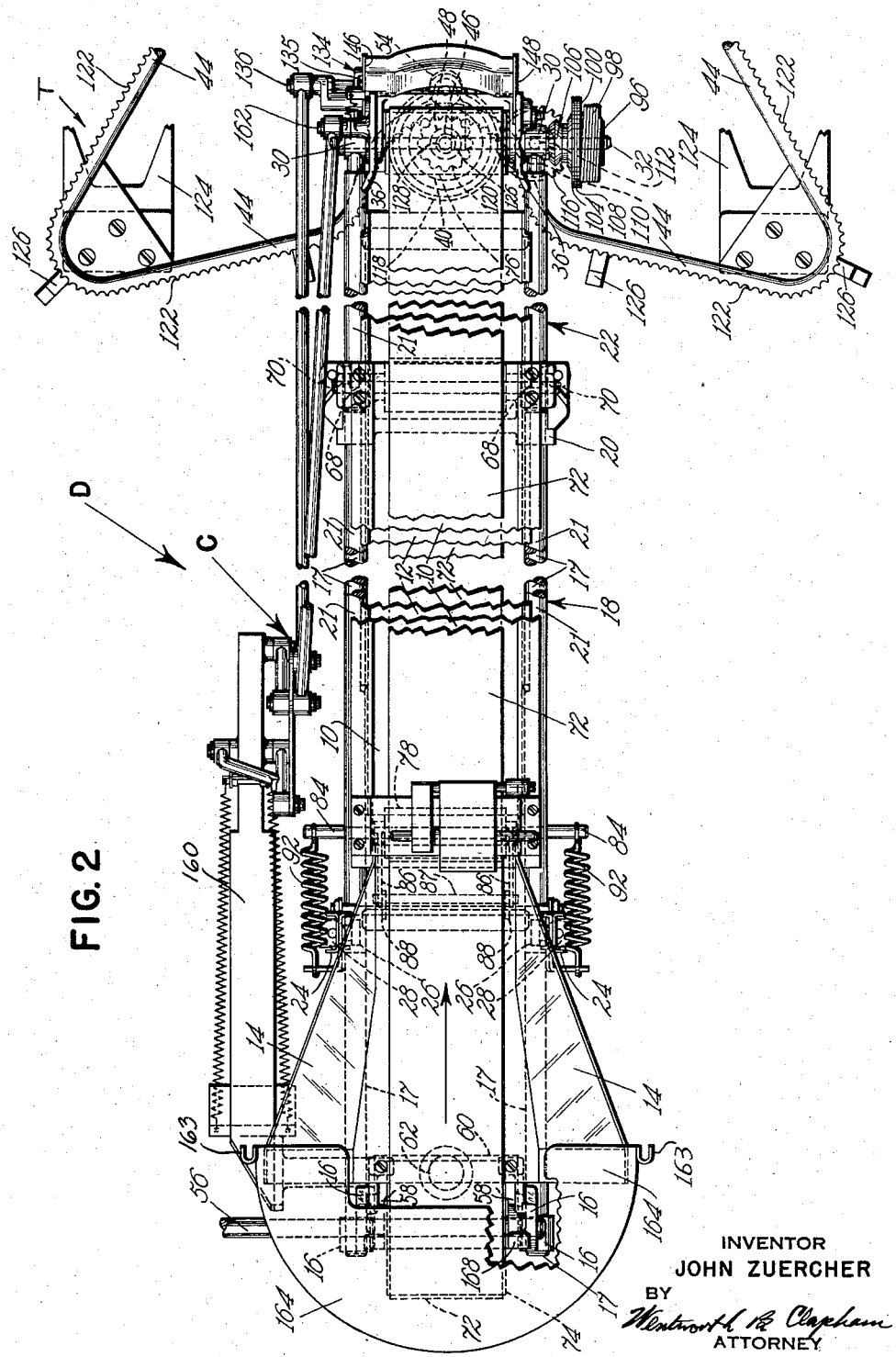

In the accompanying drawings, which form a part of this specification, and in which like characters of reference indicate the same or like parts:

Fig. 1 is a side elevation of an improved pin distributor mechanism for bowling pin spotting machines embodying the invention; and Fig. 2 is a plan view of the same.

The improved pin distributor D, shown in the accompanying drawings, consists of a pair of U-shaped pin guide chutes 10 and 12 (Figs. 1 and 2) slidably arranged in a telescopic fashion to provide a guide chute which is automatically extended or retracted depending upon which of the triangularly arranged pockets or pin receptacles (not shown) of the pin setter table is receiving a pin from distributor D.

Chute 10 at its pin receiving end is provided with a flared and funnel-shaped pin receiving end or extention 14 rigidly joined thereto, as by welding, and with chute 12 forms one continuous chute or pin guideway. At its pin receiving end, chute 10 is secured to a pair of spaced brackets 16 attached beneath pan 164, referred to hereafter, to ends of a pair of spaced rods 17 of a suitable frame 18. This arrangement makes it impossible for a pin to jam between pan 164 and to end of extension 14 when table T moves up and down. Secured to the other ends of rods 17 of frame 18 is a bridge bracket 20, to the upper end of which is mounted the extreme forward end of chute 10.

Chute 12 is secured to and carried by spaced horizontal rods 21 of a suitable frame 22 which on one end is provided with a pair of spaced vertical lugs 24 to each of which is pivoted a roller 26. Each roller 26 rolls on the top edge of the respective rod of frame 18 which is located exactly in line beneath frame 22 so that the latter at this end is supported by and slidingly engages with frame 18. To maintain frames 18 and 22 in vertical alignment and to prevent any side sway as the distributor is moved laterally and chute 12 is extended and retracted relative to chute 10, each vertical lug 24 of frame 22 carries a roller 28 which contacts the outer or lateral edge of each respective rod of frame 18.

The extreme forward ends of the rods 21 of frame 22, as viewed at the right in Figs. 1 and 2, are secured to a pair of spaced bearing lugs 30 (Fig. 2) loosely mounted on a horizontal shaft 32. Each bearing lug 30 is pivotally supported in a suitable bearing hub, one of which is provided on each of the two spaced uprights 36 of a U-shaped distributor head bracket 38. The latter at its dower central position is supported by the hub of a barrel member 40. This member is provided with a bevel surface 42, which rests on the upper rounded edge of the distributor track 44 mounted on the pin spotter table (not shown).

Bracket 38 and barrel member 40 are connected by means of a sleeve shaft 46 keyed to bracket 38. Barrel member 40 is free to rotate about sleeve shaft 46. A collar 48 attached to sleeve shaft 46 in any suitable manner prevents vertical movement of barrel member 40 on sleeve shaft 46. Pivotally attached to the outer periphery of barrel member 40 is a swivel member 50 which by means of stud 52, carries an angularly positioned trust and guide roller 54 which, together with the bevel surface 42 of barrel member 40, supports and guides the entire front end of pin distributor D on track 44. The other end of distributor D or more particularly pin receiving end 14 of the guide chute 10 is, as mentioned heretofore, supported by the pair of spaced brackets 16 pivotally held by a horizontal shaft 56 (Fig. 1) rotatably supported by a pair of spaced upright arms 58 of a U-shaped bracket 60 which at its lower end is provided with a vertical stud 62 rotatably supported in a suitable vertical bearing 64 of a bearing bracket 66 secured to the frame (not shown) of the pin setting machine.

Bridge bracket 20 to which the front end of the rim guide chute 10 is attached is also provided with two pairs of rollers 68 and 70 (Fig. 1). Rollers 70 roll upon the outer lateral surfaces of rods 21 of frame 22 and assist in retaining its vertical alignment with frame 18. Rollers 68 roll upon the upper surfaces of rods 21 of frame 22 and thus provide a roller support from which is suspended bracket 20 to which one end of frame 18 is attached.

Pin distributor D is also provided with an endless pin conveyor, such as belt 72, which is driven continuously by pulley 74. Conveyor belt 72 is led over the bottom of the substantially U-shaped channel formed by guide chutes 10 and 12, and end extension 14 onto a pulley 76 mounted on horizontal shaft 32 supported in the bearing lugs 30 and distributor head bracket 38. From pulley 76, conveyor belt 72 is led over tension roller 78 and a guide roller 80 mounted on shaft 82 supported by bridge bracket 20. Tension roller 78 is loosely mounted on a shaft 84 (Fig. 1) supported in the free ends of a pair of spaced links 86 pivotally connected at their other ends by means of horizontal shaft or rod 87 to a pair of spaced arms 88 formed on and extending upwardly from a rod or shaft 90 supported at each end in suitable bearing lugs integral with vertical lugs 24. Attached to each vertical lug 24 is a tension spring 92, the other end of which is secured to one end of floating shafts 84. This arrangement provides constant resilient tension to pin conveyor belt 72.

Pin conveyor belt 72 operates to convey pins P from a source of supply, such as a conveyor (not shown) which removes them from the pit of a bowling alley (not shown), to pin spotting receptacles (not shown) carried by the spotter table. It also provides driving means for moving the front or delivery end of the pin distributor along the heart-shaped track 44, during which time distributor D is elongated or shortened in order to accommodate it to the several positions of the spotting receptacles. Since conveyor belt 72 is driven continuously, the latter through pulley 76, imparts continuous rotary motion to shaft 32.

Adjustably clamped to one end of shaft 32 is a collar 96 to which is anchored one end of a tension spring 98. The other end of spring 98 is attached to clutch disc 100 which loosely engages with a spiral external thread of a hub or sleeve (not shown) secured to shaft 32. Another clutch disc 104 is attached to and is integral with the hub of a bevel gear 106 loosely mounted on shaft 32.

The rotary motion of the shaft 32 through clamp 96 and torsion spring 98, is imparted to clutch discs 100 and 104 which rotate bevel gear 106. The tension of spring 98 is set to a desired amount sufficient to effect a firm engagement of clutch discs 100 and 104 with a conventional clutch lining disc 108 located between them. Bevel gear 106 meshes with bevel gear 110 mounted on the upper end of vertical shaft 112 rotatably supported in a suitable bearing lug projecting from distributor head bracket 38.

A gear 116, secured to the lower end of shaft 112, meshes with a gear 118 keyed to the upper end of the barrel member 40. The lower end of barrel member 40 carries a rounded tooth gear 120, preferably formed integrally therewith, which engages with corresponding teeth 122 formed in the lateral outer edge of the heart-shaped track 44. Track 44 is supported at three points by means of suitable brackets 124 mounted on the pin spotting table. Teeth 122 conform generally with the profile of a sprocket and coact with the teeth of gear 120 to give a smooth drive which is highly desirable in insuring the most satisfactory results in the operation of distributor D.

Since it is the purpose of distributor D to deliver pins to each of the ten triangularly arranged pin spotting receptacles, the front end of distributor D following heart-shaped track 44 must be moved to and stop at each pin spotting receptacle in succession until each pin spotting receptacle contains a pin. In order to effect the desired successive interruptions in the movement of the distributor D at each of the ten receptacles, track 44 is provided with ten properly located and spaced stop lugs 126, welded or otherwise suitably attached to track 44.

As shown in Figure 1, stop lugs 126 are fixed to the under side of track 44 and project outwardly into the path of a stop pin 128 carried by and projecting vertically downwardly from the center of sleeve shaft 46 on distributor head bracket 38. The upper end of stop pin 128, which is slidably mounted in stationary sleeve shaft 46, is formed with an annular groove (not shown) into which loosely projects the forked end of an arm pivotally secured to and projecting from the bottom member of a U-shaped lever 134. Side members 135 of lever 134 are pivotally supported by a horizontal rod 136 held at each end in a pair of suitable lugs which are integral with and project from distributor head bracket 38.

The pin receiving end 14 of distributor D is pivotally, as well as swivelly connected, to a stationary bracket, while the front end is supported on the spotter table, which is adapted to move to and from the bed of an alley (not shown) for spotting pins thereon. In order to keep the front end of distributor D and its mechanism always parallel with the spotter table, regardless of its vertical position, a suitable parallelogram device C is provided. One end of parallelogram device C is pivotally attached to a suitable bar 160, projecting from and attached to bracket 60; its other end is pivotally connected to rod 136 and a stud 162 mounted in distributor head bracket 38.

A pin receiving and orienting pan 164 located at the receiving end of distributor D, insures that pins delivered from the elevating conveyor (not shown) will be delivered properly and that the head ends of pins cannot jam between extension 14 and chute 10. Pan 164 is mounted on a bracket fixed to a pair of extension lugs 168, projecting upwardly from upright members 58 of U-shaped bracket 60. Since the latter can only swing in a horizontal plane, pin receiving pan 164 also remains in horizontal position.

During the pin delivery operation of the associated elevating conveyor (not shown), bowling pins are delivered to the pin receiving and orienting pan 164 either with butt ends or head ends foremost. It is essential, however, that all pins delivered to the pinspotting units (not shown) of table T be deposited onto conveyor belt 72 butt end first. Pins delivered to pan 164 in butt end foremost position will be guided by extensions 14 butt end first onto pin conveyor belt 72. The handles of pins delivered to pan 164 in head end foremost position will engage a pin guide member 163 and pivot thereabout orienting these pins for movement butt end first onto conveyor 72. Thus all pins will be positioned on conveyor 72 butt end foremost no matter how they were delivered to pan 164.

Pins delivered to pan 164 by the associated elevating conveyor (not shown) are oriented by pin guide member 163 for movement butt end first onto conveyor 172. This orienting function is accomplished substantially as that described in R. L. Holloway et al. Patent 2,767,983 for Bowling Pin Elevating mechanism, and in J. Zuercher Patent 2,767,984 for Pin Distributing and Spotting Mechanism for Bowling Pin Spotting Machines. Therefore, since this function forms no part of the present invention, further disclosure thereof is omitted.

The invention above described may be varied in construction within the scope of the claims, for the particular embodiments selected to illustrate the invention are but a few of the possible concrete forms which my invention may assume. The invention, therefore, is not to be restricted to the precise details of the structures shown and described.

What I claim is:

1. Pin distributing mechanism for a bowling pin spotting machine comprising, a swivel support bracket, a pin receiving pan mounted on said bracket for movement in substantially a horizontal plane, a first chute member pivotally attached to said bracket beneath said pan for vertical swinging movement relative to said pan and for movement in a substantially horizontal plane conjointly with said pan, said first chute member being formed at its end adjacent said pan with portions extending upwardly along and adjacent the sides of said pan, a second chute member operatively connected with said first chute for conjoint movement therewith, means for mounting said second chute for longitudinal movement relative to said first chute, endless belt means located in said first and second chutes, means for driving said belt means to travel pins delivered thereonto from said pan to a point of discharge from said second chute.

2. Pin distributing mechanism for a bowling pin spotting machine comprising a swivel supporting bracket, a pin receiving pan mounted on said bracket for movement in a substantially horizontal plane a first chute member pivotally attached to said bracket beneath said pan for vertical swinging movement relative to said pan and for movement in a substantially horizontally plane conjointly with said pan, said first chute member being provided on its end adjacent said pan with outwardly and upwardly flaring pin receiving and guide portions extending upwardly in proximity with the sides of said pan, and with a bottom portion extending beneath said receiving pan, whereby bowling pins delivered onto said pan are guided thereby and by said flaring portions downwardly for delivery therefrom butt end foremost, a second chute member operatively connected with said first chute for conjoint movement therewith, means for mounting said second chute for longitudinal movement relative to said first chute, an endless belt located in said first and second chutes, and means for driving said belt to travel pins delivered thereonto from said pan to selected laterally and longitudinally spaced points of discharge from said second chute.

3. The invention as defined in claim 1 wherein said belt means is operative to move said second chute member longitudinally relative to said first chute member and convey pins delivered thereto from said pan to longitudinal and laterally spaced points of discharge from said second chute.

References Cited in the file of this patent
UNITED STATES PATENTS

| | | |
|---|---|---|
| 269,561 | Cortelyow | Dec. 26, 1882 |
| 289,204 | Allison | Nov. 27, 1883 |
| 699,668 | Drake | May 13, 1902 |
| 921,696 | Hart | May 18, 1909 |
| 1,212,890 | Billings | Jan. 16, 1917 |
| 1,321,531 | Manierre | Nov. 11, 1919 |
| 2,612,250 | Sarosdy | Sept. 30, 1952 |